United States Patent
Holley, Jr.

(10) Patent No.: US 9,670,968 B1
(45) Date of Patent: Jun. 6, 2017

(54) SHAFT LOCKING ASSEMBLIES AND METHODS

(71) Applicant: William T. Holley, Jr., Tenaha, TX (US)

(72) Inventor: William T. Holley, Jr., Tenaha, TX (US)

( * ) Notice: Subject to any disclaimer, the term of this patent is extended or adjusted under 35 U.S.C. 154(b) by 430 days.

(21) Appl. No.: 14/289,719

(22) Filed: May 29, 2014

(51) Int. Cl.
*F16D 25/0632* (2006.01)
*F16D 25/12* (2006.01)

(52) U.S. Cl.
CPC ......... *F16D 25/0632* (2013.01); *F16D 25/12* (2013.01); *Y10T 403/7054* (2015.01)

(58) Field of Classification Search
CPC ............... F16D 25/0632; Y10T 403/22; Y10T 403/253; Y10T 403/25; Y10T 403/7051; Y10T 403/7054; Y10T 403/7058
USPC ............................... 464/24, 42, 43
See application file for complete search history.

(56) References Cited

U.S. PATENT DOCUMENTS

| | | | | |
|---|---|---|---|---|
| 1,579,903 A | * | 4/1926 | Yungling | E21B 19/008 192/12 R |
| 2,760,800 A | * | 8/1956 | Wekeman | F16D 1/094 403/366 |
| 3,751,941 A | * | 8/1973 | Stiff | F16D 7/02 192/82 T |
| 4,064,708 A | * | 12/1977 | Breads | F16B 3/00 403/369 |
| 4,425,050 A | | 1/1984 | Durand | |
| 4,702,635 A | * | 10/1987 | Muellenberg | F16D 1/093 29/426.6 |
| 4,859,106 A | * | 8/1989 | Elsner | F16D 1/091 403/15 |
| 4,979,842 A | * | 12/1990 | Miller | F16D 1/091 403/15 |
| 5,149,220 A | | 9/1992 | Elsner et al. | |
| 5,156,480 A | * | 10/1992 | Elsner | F16D 1/05 403/15 |
| 5,476,337 A | | 12/1995 | Mullenberg | |
| 5,947,626 A | | 9/1999 | Miller et al. | |
| 6,231,262 B1 | | 5/2001 | Whitney | |
| 6,431,786 B2 | | 8/2002 | Fabbri et al. | |

(Continued)

FOREIGN PATENT DOCUMENTS

DE  2 207 641 A1 * 9/1972
DE  37 44 284 A1 * 7/1989

*Primary Examiner* — Robert Canfield
(74) *Attorney, Agent, or Firm* — R. Keith Harrison

(57) ABSTRACT

Shaft locking assemblies for a drive shaft include an assembly hub configured to accommodate the drive shaft, the assembly hub including a stop plate; an assembly hub interior in the assembly hub; a contractible shaft locking sleeve disposed in the assembly hub interior and configured to accommodate the drive shaft, the shaft locking sleeve engaging the stop plate; at least one pusher sleeve engaging the shaft locking sleeve; a fluid pressure space disposed in pressure transmitting relationship to the pusher sleeve; and a fluid pressurizing mechanism disposed in fluid communication with the fluid pressure space. The pusher sleeve is adapted to push against the shaft locking sleeve and the shaft locking sleeve is adapted to contract and push against the stop plate and contract against the drive shaft responsive to introducing a pressurizing fluid into the fluid pressure space. Methods of locking a rotating element on a drive shaft are also disclosed.

17 Claims, 12 Drawing Sheets

(56) References Cited

U.S. PATENT DOCUMENTS

| | | |
|---|---|---|
| 6,599,052 B1 | 7/2003 | Phillips |
| 7,837,406 B2 | 11/2010 | Landwehr |
| 2004/0159524 A1* | 8/2004 | Carpenter ........... F16D 25/0632 |
| | | 192/85.21 |
| 2014/0161515 A1* | 6/2014 | Heston .................... F16D 1/094 |
| | | 403/342 |

* cited by examiner

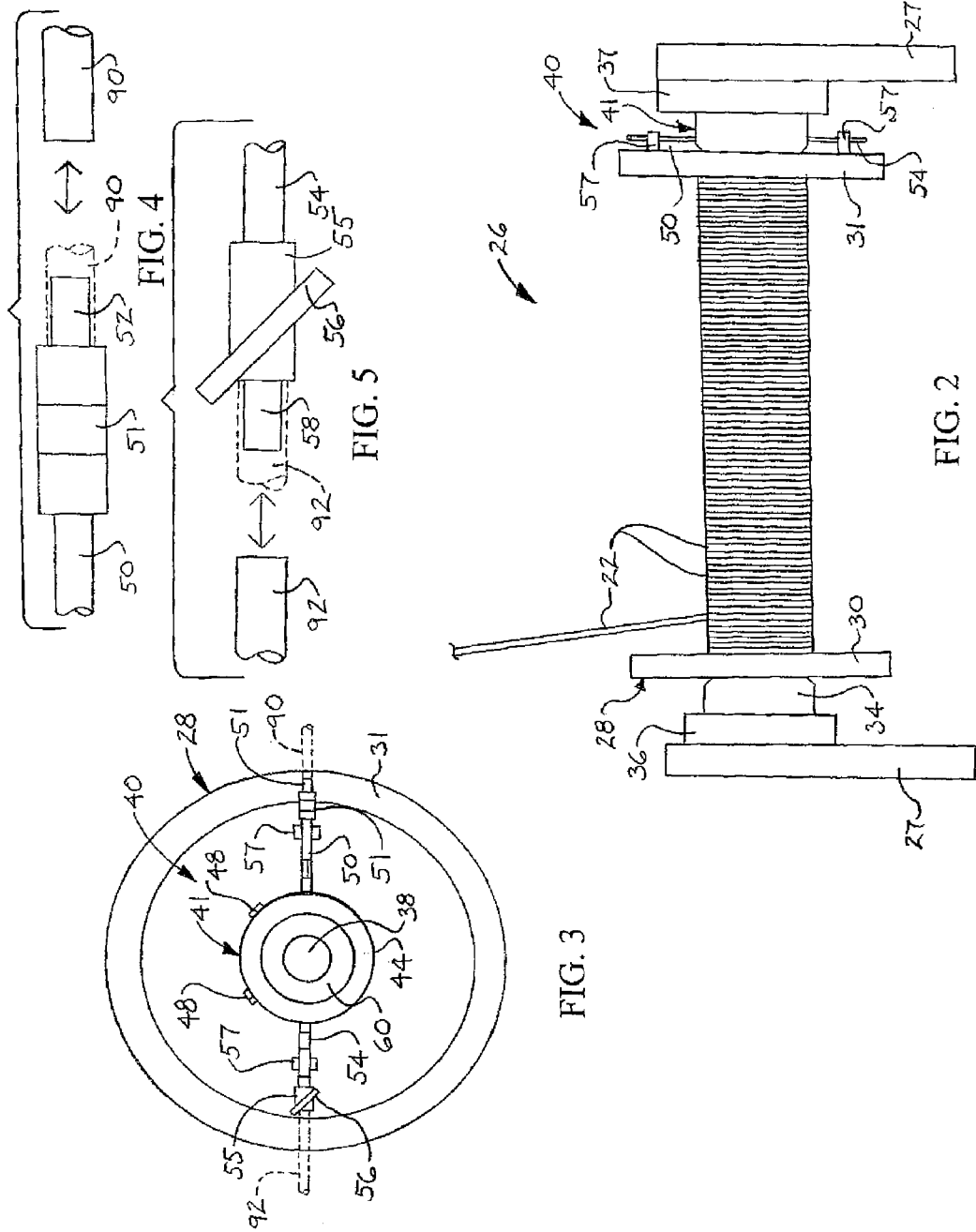

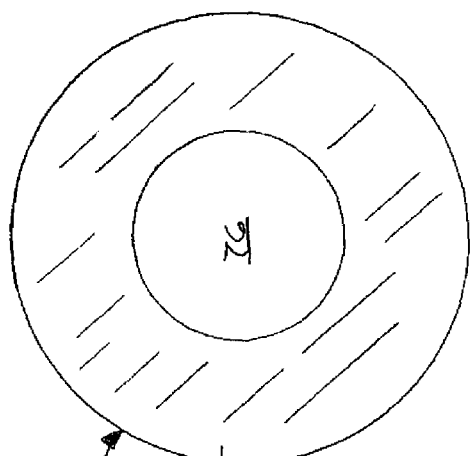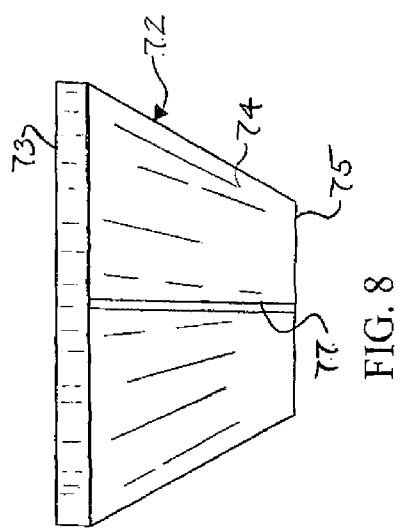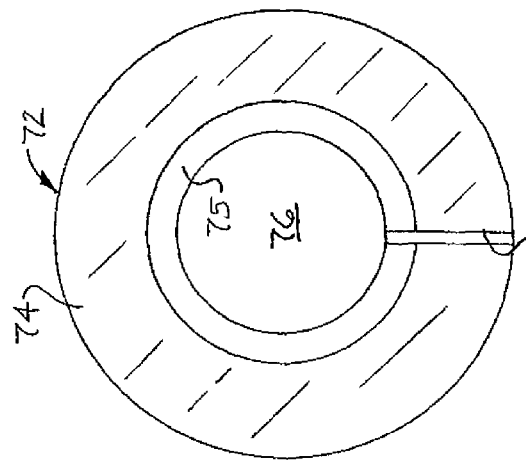

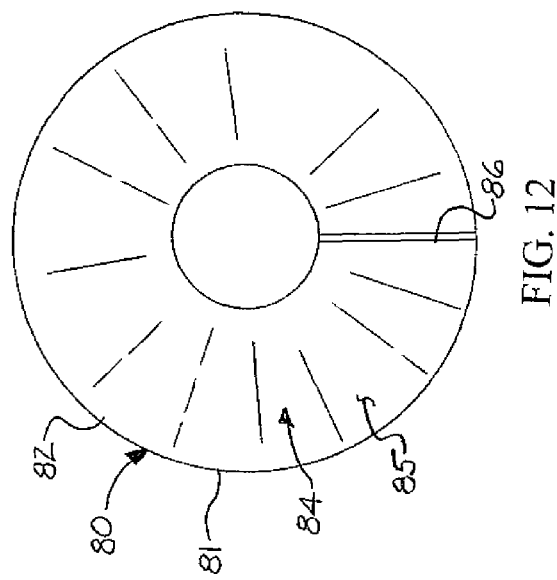
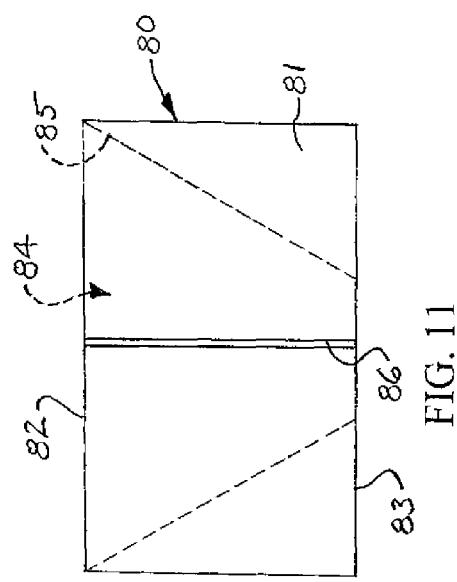
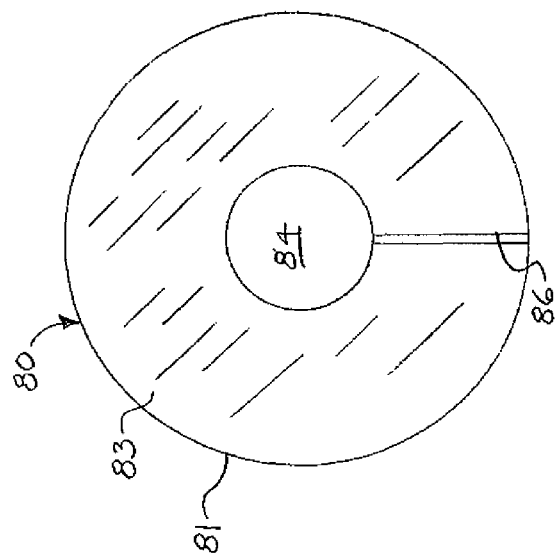
FIG. 11
FIG. 12
FIG. 13

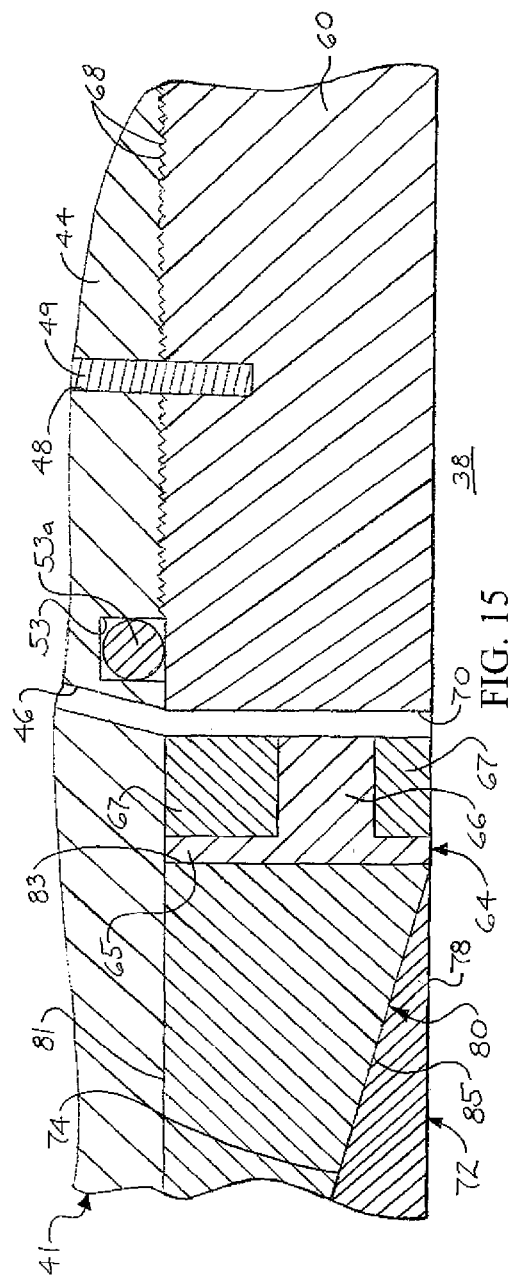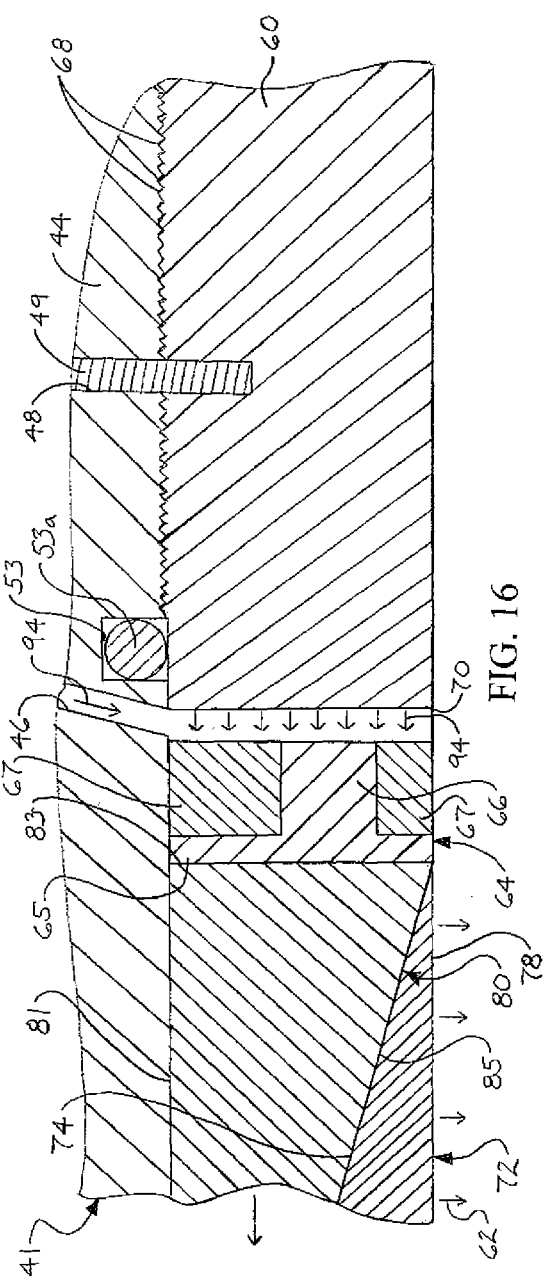

SHAFT LOCKING ASSEMBLIES AND METHODS

FIELD

Illustrative embodiments of the disclosure generally relate to devices for securing a rotating element to a drive shaft. More particularly, illustrative embodiments of the disclosure relate to shaft locking assemblies and methods in which a drum or other rotating element is locked onto a drive shaft using a pressurizing fluid and which is suitable for applications in which a large magnitude of resistance is applied to the rotating element.

BACKGROUND

The background description provided herein is solely for the purpose of generally presenting the context of the illustrative embodiments of the disclosure. Aspects of the background description are neither expressly nor impliedly admitted as prior art against the claimed subject matter.

Various types of devices and techniques are used to attach a rotating element to a drive shaft. However, in applications in which a large magnitude of pressure is applied to the rotating element, such as in the operation of a draw works which raises and lowers a traveling block in oil and gas drilling and recovery operations, for example, the structural and operational integrity of these devices and techniques may be compromised.

Accordingly, shaft locking assemblies and methods in which a drum or other rotating element is locked onto a drive shaft using a pressurizing fluid and which is suitable for applications in which a large magnitude of pressure is applied to the rotating element may be desirable for some applications.

SUMMARY

Illustrative embodiments of the disclosure are generally directed to shaft locking assemblies for a drive shaft. An illustrative embodiment of the shaft locking assemblies includes an assembly hub configured to accommodate the drive shaft, the assembly hub including a stop plate; an assembly hub interior in the assembly hub; a contractible shaft locking sleeve disposed in the assembly hub interior and configured to accommodate the drive shaft, the shaft locking sleeve engaging the stop plate; at least one pusher sleeve engaging the shaft locking sleeve; a fluid pressure space disposed in pressure transmitting relationship to the pusher sleeve; and a fluid pressurizing mechanism disposed in fluid communication with the fluid pressure space. The pusher sleeve is adapted to push against the shaft locking sleeve and the shaft locking sleeve is adapted to contract and push against the stop plate and contract against the drive shaft responsive to introducing a pressurizing fluid into the fluid pressure space.

In some embodiments, the shaft locking assemblies may be adapted for a drive shaft having a drive segment, a driven segment and a shaft gap between the drive segment and the driven segment. The shaft locking assemblies may include an assembly hub including a stop plate; a distal pusher sleeve engaging the stop plate; a contractible shaft locking sleeve engaging the distal pusher sleeve, the shaft locking sleeve adapted to straddle the shaft gap between the drive segment and the driven segment of the drive shaft; a proximal pusher sleeve engaging the shaft locking sleeve; a push plate engaging the proximal pusher sleeve; a fluid pressure space disposed in pressure transmitting relationship to the proximal pusher sleeve; and a fluid pressurizing mechanism disposed in fluid communication with the fluid pressure space. The proximal pusher sleeve is adapted to push against the shaft locking sleeve, the shaft locking sleeve is adapted to push against the distal pusher sleeve and the shaft locking sleeve is adapted to contract and push against the drive shaft segment and the driven shaft segment of the drive shaft responsive to introducing a pressurizing fluid into the fluid pressure space.

Illustrative embodiments of the disclosure are further generally directed to methods of locking a rotating element on a drive shaft. An illustrative embodiment of the methods includes mounting the rotating element on an assembly hub of a shaft locking assembly, applying a pressurizing fluid against at least one pusher sleeve, applying the pusher sleeve against a shaft locking sleeve and applying the shaft locking sleeve against the drive shaft and the assembly hub.

BRIEF DESCRIPTION OF THE DRAWINGS

Illustrative embodiments of the disclosure will now be described, by way of example, with reference to the accompanying drawings, in which:

FIG. 2 is a front view of a drum on the draw works, a drum motor drivingly engaging the drum and the illustrative shaft locking assembly coupling the drum to the drum motor in exemplary application of the shaft locking assembly;

FIG. 3 is an end view of the drum illustrated in FIG. 2, with the shaft locking assembly coupling the drum to the drum motor (not illustrated);

FIG. 4 is an exploded side view, partially in section, of an exemplary fluid inlet conduit of the shaft locking assembly, more particularly illustrating detachable coupling of a fluid inlet hose to the fluid inlet conduit in exemplary application of the shaft locking assembly;

FIG. 5 is an exploded side view, partially in section, of an exemplary fluid outlet conduit of the shaft locking assembly, more particularly illustrating detachable coupling of a fluid outlet hose to the fluid outlet conduit in exemplary application of the shaft locking assembly;

FIG. 8 is a side view of an exemplary shaft locking sleeve of the drum locking assembly;

FIG. 9 is a rear view of the exemplary shaft locking sleeve;

FIG. 10 is a front view of the exemplary shaft locking sleeve;

FIG. 11 is a side view of an exemplary pusher sleeve of the drum locking assembly;

FIG. 12 is a rear view of the exemplary pusher sleeve;

FIG. 13 is a front view of the exemplary pusher sleeve;

FIG. 15 is an enlarged longitudinal sectional view of the drum locking assembly disposed in a depressurized shaft-disengaging configuration;

FIG. 16 is an enlarged longitudinal sectional view of the drum locking assembly disposed in a pressurized shaft-engaging configuration;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description. While the description of the shaft locking assemblies and methods will be hereinafter described with respect to operation of a swab rig which is used to remove water from a hydrocarbon-producing well, it will be recognized and understood that the shaft locking assemblies and methods are equally applicable to drilling and workover rigs as well as applications outside the oil and gas drilling and recovery industry.

Figure 1:
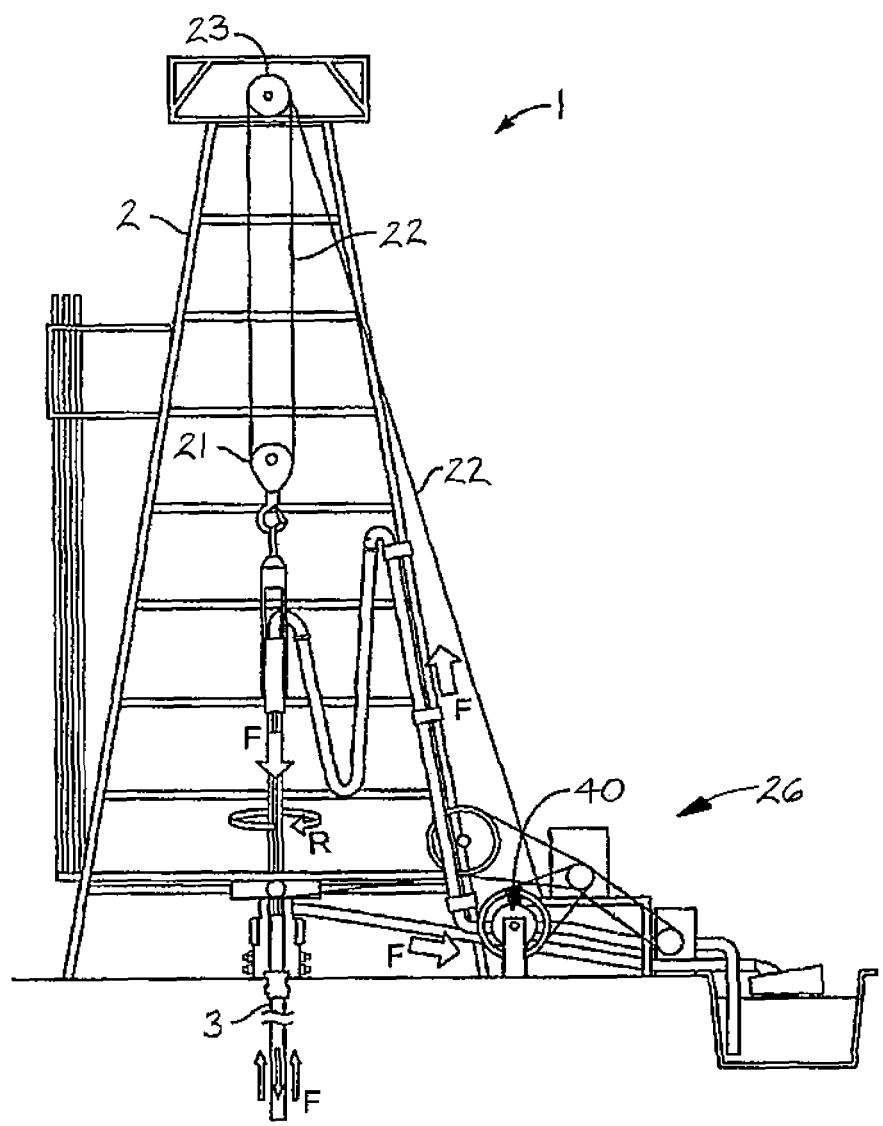
FIG. 1 is a front view of a swab rig having a draw works including an illustrative embodiment of the shaft locking assembly in exemplary implementation of the shaft locking assembly.

Referring initially to FIGS. 1 and 2 of the drawings, a swab rig 1 (FIG. 1) in exemplary implementation of an illustrative embodiment of the shaft locking assembly 40 is illustrated. The swab rig 1 may be used to remove water from a subterranean hydrocarbon production well for the purpose of enhancing production of hydrocarbons from the well. The swab rig 1 may include a derrick 2 which provides support for a crown block 23 and a traveling block 21 used to raise and lower a drill string 3 into and out of a subterranean well bore, typically in the conventional manner. A draw works 26 may be connected to the crown block 23 and the traveling block 21 via a hoist line 22 to selectively raise and lower the traveling block 21 via the hoist line 22.

As illustrated in FIG. 2, the draw works 26 may include a pair of spaced-apart drum stands 27. A drum 28 on which the hoist line 22 is wound may be rotatably mounted on the drum stands 27. A drum motor 37 drivingly engages the drum 28 for rotation of the drum 28 on the drum stands 27. A drum brake 36 engages the drum 28 typically through a taper lock hub 34 (FIG. 7) to slow or stop rotation of the drum 28 on the drum stands 27. In a manner which will be hereinafter described, the shaft locking assembly 40 may facilitate selective engagement of the drum motor 37 with the drum 28 for rotation of the drum 28 and winding and unwinding of the hoist line 22 on the drum 28 to facilitate raising and lowering of the traveling block 21 and the drill string 3 on the derrick 2. Accordingly, while the shaft locking assembly 40 will be hereinafter described as applicable to facilitating driving engagement of the drum motor 37 with the drum 28 on the draw works 26 and raising and lowering of the traveling block 21 on the derrick 2 of the swab rig 1, it will be recognized and understood that the shaft locking assembly 40 is amenable to a variety of other applications in which it is desired to drivingly couple a drive motor or drive shaft to a rotating element, particularly applications in which a large magnitude of resistance is applied to the rotating element.

Figure 6:
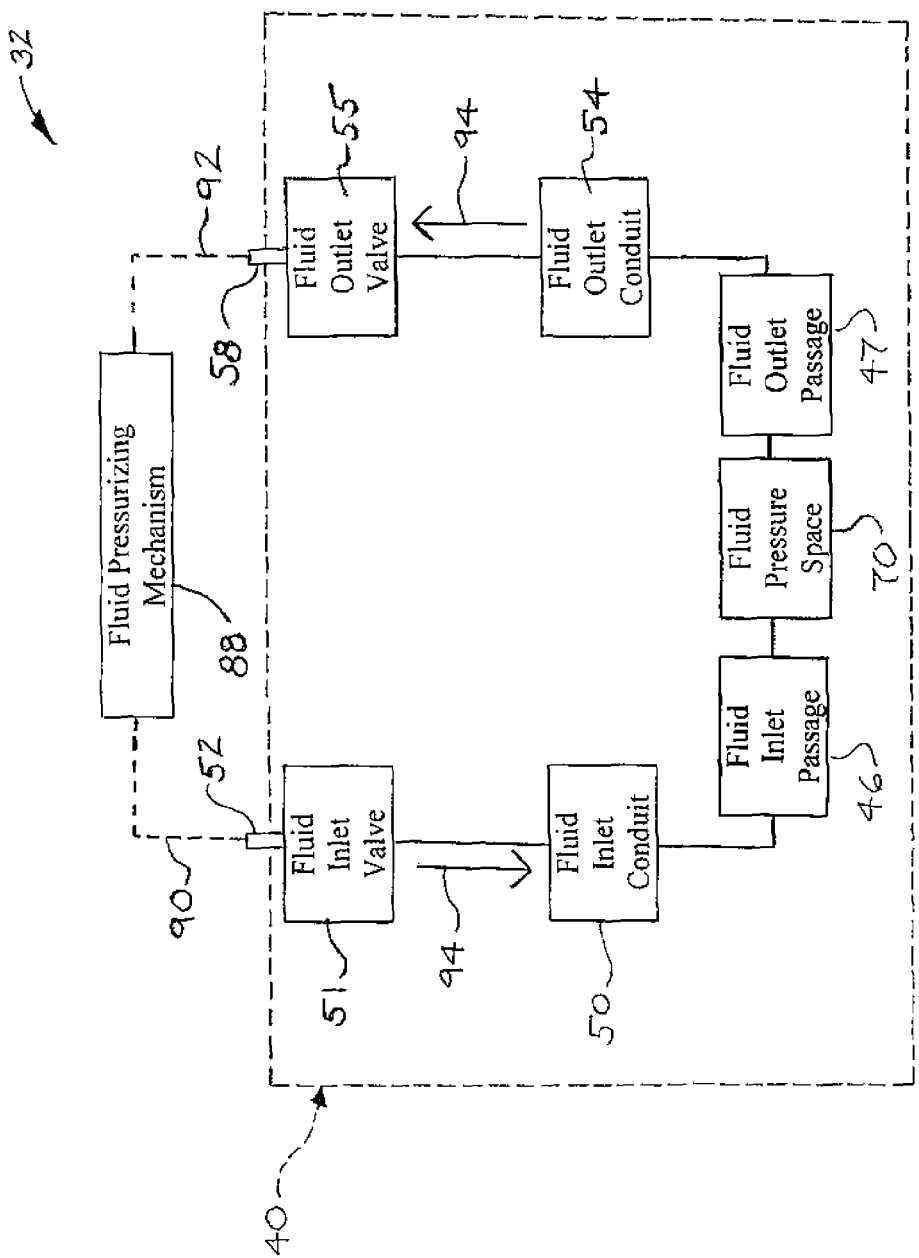
FIG. 6 is a functional block diagram of an exemplary fluid pressurizing system suitable for implementation of an illustrative embodiment of the shaft locking assembly.
Figure 7:
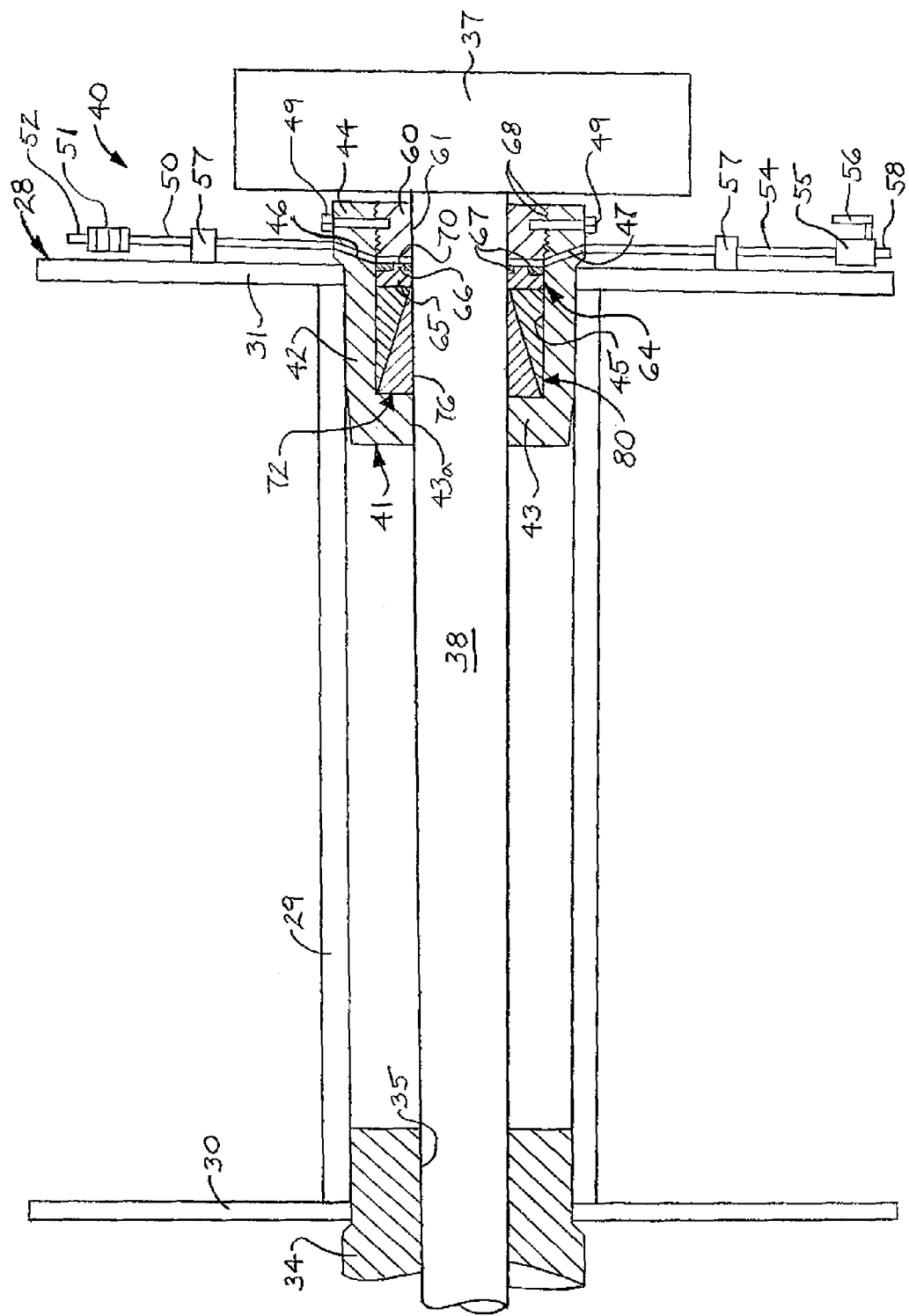
FIG. 7 is a longitudinal sectional view of the drum of the draw works with an illustrative embodiment of the drum locking assembly coupling the drum to the drum motor.
Figure 14:
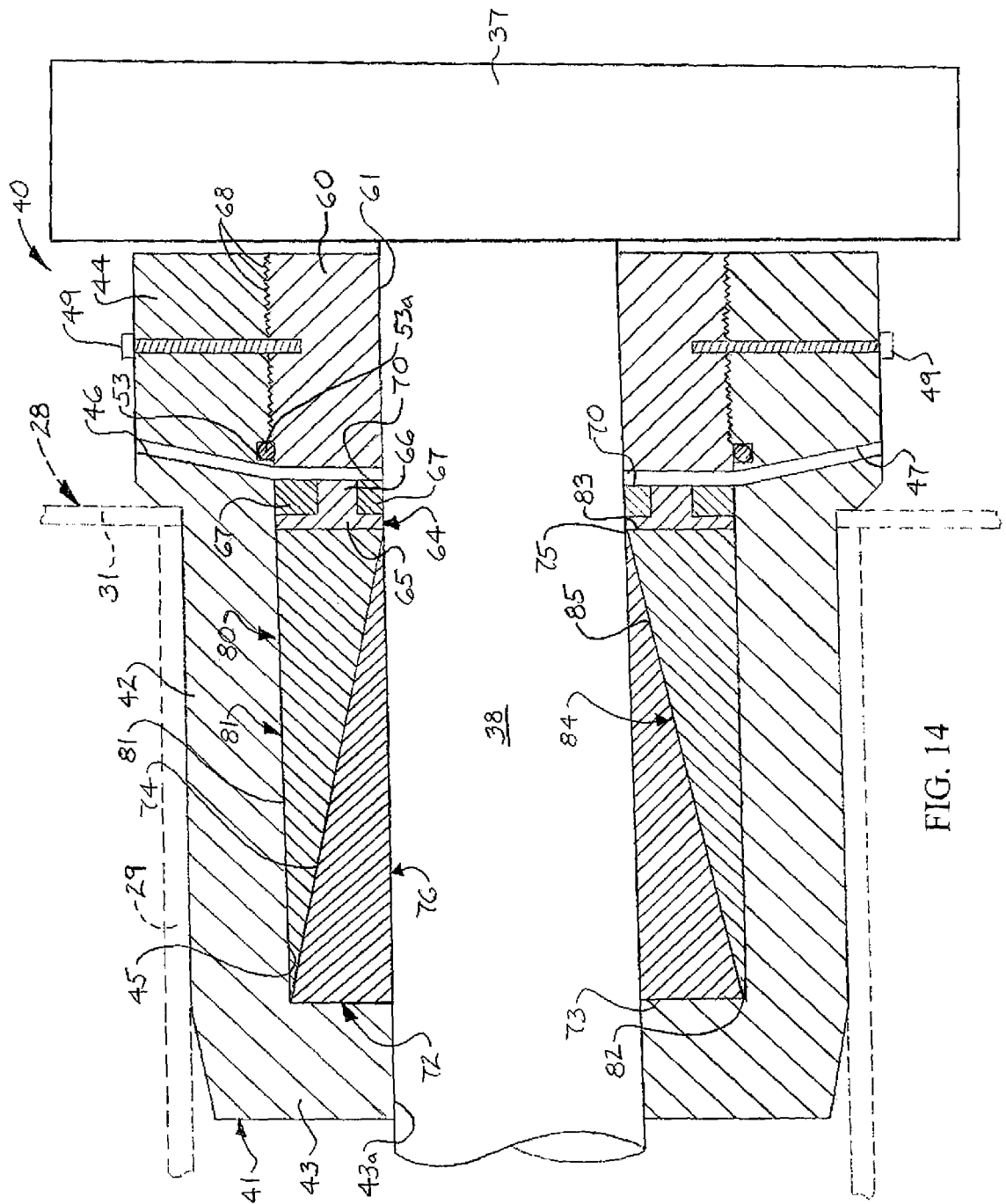
FIG. 14 is an enlarged longitudinal sectional view of the drum locking assembly.

Referring next to FIGS. 3-16 of the drawings, the shaft locking assembly 40 may include an assembly hub 41, as illustrated in FIGS. 7 and 14. The assembly hub 41 may include a generally cylindrical assembly hub wall 42 and a stop plate 43 which terminates a first end of the assembly hub wall 42. The stop plate 43 may have a central shaft opening 43a which accommodates a drive shaft 38 that is drivingly engaged by the drum motor 37. An assembly hub interior 45 may be formed by and between the assembly hub wall 42 and the stop plate 43.

An assembly hub flange 44 may terminate a second end of the assembly hub wall 42. A radial fluid inlet passage 46 and a radial fluid outlet passage 47 may extend through the assembly hub flange 44 for purposes which will be hereinafter described. An annular shaft hub 60 may have a shaft opening 61 which accommodates the drive shaft 38. The assembly hub flange 44 of the assembly hub 41 may be secured to the shaft hub 60 via threads 68, at least one hub fastener 49 and/or other suitable securing mechanism known by those skilled in the art. As illustrated in FIG. 14, an annular O-ring groove 53 may be provided in the assembly hub flange 44 at the interface with the shaft hub 60 and adjacent to the fluid inlet passage 46 and the fluid outlet passage 47. An O-ring 53a may be provided in the O-ring groove 53 for fluid sealing purposes.

As further illustrated in FIG. 7, the drum 28 may include a generally elongated, cylindrical drum cylinder 29 opposite ends of which may be welded and/or otherwise secured or attached to the taper lock hub 34 and to the assembly hub 41 of the shaft locking assembly 40. The taper lock hub 34 may include a drive shaft opening 35 which accommodates the drive shaft 38. A brake end drum flange 30 and a motor end drum flange 31 may be provided at the respective ends of the drum cylinder 29.

An annular shaft locking sleeve 72 is disposed in the assembly hub interior 45 of the assembly hub 41. As illustrated in FIGS. 8-10, the shaft locking sleeve 72 may include an annular shaft locking sleeve base 73. A conical or tapered shaft locking sleeve wall 74 may extend from the shaft locking sleeve base 73. A flat or blunt shaft locking sleeve end 75 may terminate the shaft locking sleeve wall 74. A shaft locking sleeve bore 76 (FIGS. 9 and 10) may extend through the shaft locking sleeve wall 74 from the shaft locking sleeve base 73 to the shaft locking sleeve end 75. In some embodiments, a shaft locking sleeve slot 77 which communicates with the shaft locking sleeve bore 76 may extend through the shaft locking sleeve wall 74 from the shaft locking sleeve base 73 to the shaft locking sleeve end 75. Accordingly, as illustrated in FIG. 14, the shaft locking sleeve bore 76 accommodates the drive shaft 38 with the shaft locking sleeve base 73 engaging the interior surface of the stop plate 43 on the assembly hub 41 and the shaft locking sleeve end 75 proximate the shaft hub 60.

An annular pusher sleeve 80 is disposed in the assembly hub interior 45 of the assembly hub 41 in meshing engagement with the shaft locking sleeve 72. As illustrated in FIGS. 11-13, the pusher sleeve 80 may include a generally cylindrical sleeve body 81 having a wide bore end 82 and a narrow bore end 83. A pusher sleeve bore 84, having a tapered or conical interior sleeve surface 85, may extend through the sleeve body 81 from the wide bore end 82 to the narrow bore end 83. Thus, the wide end of the pusher sleeve bore 84 opens to the wide bore end 82 and the narrow end of the pusher sleeve bore 84 opens to the narrow bore end 83 of the sleeve body 81. In some embodiments, a pusher sleeve slot 86 which communicates with the pusher sleeve bore 84 may extend through the sleeve body 81 from the wide bore end 82 to the narrow bore end 83. Accordingly, as illustrated in FIG. 14, at the narrow bore end 83, the pusher sleeve bore 84 accommodates the drive shaft 38. From the narrow bore end 83 to the wide bore end 82, the pusher sleeve bore 84 accommodates the diverging shaft locking sleeve wall 74 of the shaft locking sleeve 72, with the interior sleeve surface 85 of the pusher sleeve 80 engaging the complementary shaped shaft locking sleeve wall 74 of the shaft locking sleeve 72. The wide bore end 82 of the pusher sleeve 80 engages the stop plate 43 on the assembly hub 41, and the narrow bore end 83 of the pusher sleeve 80 is proximate the shaft hub 60.

An annular push plate 64 may be provided in the assembly hub interior 45 of the assembly hub 41 in engagement with the narrow bore end 83 of the pusher sleeve 80. In some embodiments, the push plate 64 may include a push plate base 65 which engages the pusher sleeve 80. A push plate flange 66 may extend from the push plate base 65. A pair of elastomeric push plate seals 67 may be provided in the respective spaces on opposite sides of the push plate flange 66 and between the push plate base 65 and the shaft hub 60. An annular fluid pressure space 70 may be formed by and between the shaft hub 60 and the push plate flange 66 of the push plate 64 and the push plate seals 67 for purposes which will be hereinafter described. The fluid pressure space 70 registers with the fluid inlet passage 46 and the fluid outlet passage 47 in the assembly hub flange 44 of the assembly hub 41.

As illustrated in FIG. 7, a fluid inlet conduit 50 and a fluid outlet conduit 54 may be disposed in fluid communication with the fluid inlet passage 46 and the fluid outlet passage 47, respectively, in the assembly hub flange 44 of the assembly hub 41. As illustrated in FIGS. 3 and 7, in some embodiments, the fluid inlet conduit 50 and the fluid outlet conduit 54 may be attached to the exterior surface of the motor end drum flange 31 of the drum 28 using at least one conduit clamp 57 and/or other suitable attachment technique known by those skilled in the art. As illustrated in FIG. 4, a fluid inlet valve 51 may be provided in the fluid inlet conduit 50. An inlet hose connector 52 may terminate the fluid inlet conduit 50 at the fluid inlet valve 51. The inlet hose connector 52 facilitates releasable fluid coupling of a fluid inlet hose 90 to the fluid inlet conduit 50 for purposes which will be hereinafter described. As illustrated in FIG. 5, a fluid outlet valve 55 may be provided in the fluid outlet conduit 54. An outlet hose connector 58 may terminate the fluid outlet conduit 54 at the fluid outlet valve 55. The outlet hose connector 58 facilitates releasable fluid coupling of a fluid outlet hose 92 to the fluid outlet conduit 54 for purposes which will be hereinafter described. In some embodiments, the fluid outlet valve 55 may be fitted with a valve handle 56 which facilitates selective opening and closing of the fluid outlet valve 55 for purposes which will be hereinafter described.

In exemplary application of the shaft locking assembly 40, a fluid pressurizing system 32 (FIG. 6) may be operated to pressurize the pusher sleeve 80 against the shaft locking sleeve 72 such that the shaft locking sleeve 72 is pushed against the drive shaft 38 and the stop plate 43 of the assembly hub 41, as illustrated in FIG. 16, for transmission of rotation from the drive shaft 38 to the drum 28 by operation of the drum motor 37. As illustrated in FIG. 6, the fluid pressurizing system 32 may include a fluid pressurizing mechanism 88. The fluid pressurizing mechanism 88 may include any type of mechanism, device or technique which is known by those skilled in the art and suitable for pressurization of a pressurizing fluid 94 such as hydraulic fluid, oil or grease, for example and without limitation. The fluid inlet hose 90 and the fluid outlet hose 92 may be disposed in fluid communication with the fluid pressurizing mechanism 88. The fluid inlet hose 90 and the fluid outlet hose 92 may be adapted for detachable coupling to the inlet hose connector 52 at the fluid inlet valve 51 and to the outlet hose connector 58 at the fluid outlet valve 55, respectively, as was heretofore described with respect to FIGS. 4 and 5, for pressurization and depressurization, respectively, of the shaft locking assembly 40. Accordingly, with the valve handle 56 (FIG. 5) of the fluid outlet valve 55 in the closed position, the fluid inlet hose 90 is initially coupled to the fluid inlet conduit 50 at the inlet hose connector 52. Operation of the fluid pressurizing system 32 facilitates flow of the pressurizing fluid 94 through the fluid inlet hose 90, the inlet hose connector 52, the fluid inlet valve 51, the fluid inlet conduit 50, the fluid inlet passage 46, the fluid pressure space 70, the fluid outlet passage 47 and the fluid outlet conduit 54, respectively, until a predetermined target pressure of the pressurizing fluid 94 in the fluid pressure space 70 is achieved. The fluid inlet hose 90 may next be uncoupled from the inlet hose connector 52. The fluid inlet valve 51 prevents backflow of the pressurizing fluid 94 from the fluid inlet conduit 50. The closed fluid outlet valve 55 prevents flow of the pressurizing fluid 94 from the fluid outlet conduit 54.

The pre-pressurized configurations of the pusher sleeve 80 and the shaft locking sleeve 72 are illustrated in FIG. 15. Upon flow of the pressurizing fluid 94 from the fluid inlet passage 46 into the fluid pressure space 70, as was heretofore described, the pressurizing fluid 94 applies pressure against the push plate 64, which in turn applies pressure against the pusher sleeve 80, as illustrated in FIG. 16. The pusher sleeve 80 in turn applies pressure against the shaft locking sleeve 72, which contracts and pushes against both the stop plate 43 of the assembly hub 41 and against the drive shaft 38 with a shaft compression force 62. Consequently, the shaft locking sleeve 72 couples the drive shaft 38 to the drum 28 through the assembly hub 41 and transmits rotation from the drive shaft 38 to the drum 28 responsive to operation of the drum motor 37 to facilitate winding and unwinding of the hoist line 22 on the drum 28 and raising and lowering of the traveling block 21 (FIG. 1) on the derrick 2. It will be appreciated by those skilled in the art that the presence of the shaft locking sleeve slot 77 (FIGS. 8 and 10) in the shaft locking sleeve 72 and the pusher sleeve slot 86 (FIGS. 11-13) in the pusher sleeve 80 in some embodiments may enable the shaft locking sleeve 72 and the pusher sleeve 80 to contract in the assembly hub interior 45 and increase the pressure which the shaft locking sleeve 72 applies to the drive shaft 38 and the assembly hub 41.

In some illustrative embodiments, the area of the assembly hub 41 in which the pusher sleeve 80 and the shaft locking sleeve 72 are contained may be about 41 square inches. The area of the drive shaft 38 which is contacted by the shaft locking sleeve 72 may be about 14.725 inches, corresponding to an area of about 26.275 square inches of push surfaces on the drive shaft 38 and the stop plate 43. Thus, at a pressure of 9,000 psi for the pressurizing fluid 94 in the fluid pressure space 70, the shaft locking sleeve 72 may apply a shaft compression force 62 (FIG. 16) of about 236,475 psi to the drive shaft 38.

After use, the shaft locking assembly 40 can be selectively depressurized by initially connecting the fluid outlet hose 92 to the outlet hose connector 58 and then manipulating the valve handle 56 (FIG. 5) of the fluid outlet valve 55 from the closed position to the open position. This facilitates discharge of the pressurizing fluid 94 from the fluid outlet conduit 54 through the fluid outlet hose 92 and back to the fluid pressurizing mechanism 88 of the fluid pressurizing system 32 (FIG. 6). Accordingly, the pressure of the pressurizing fluid 94 in the fluid pressure space 70 is released such that the drum 28 is uncoupled from the drive shaft 38.

Figure 17:
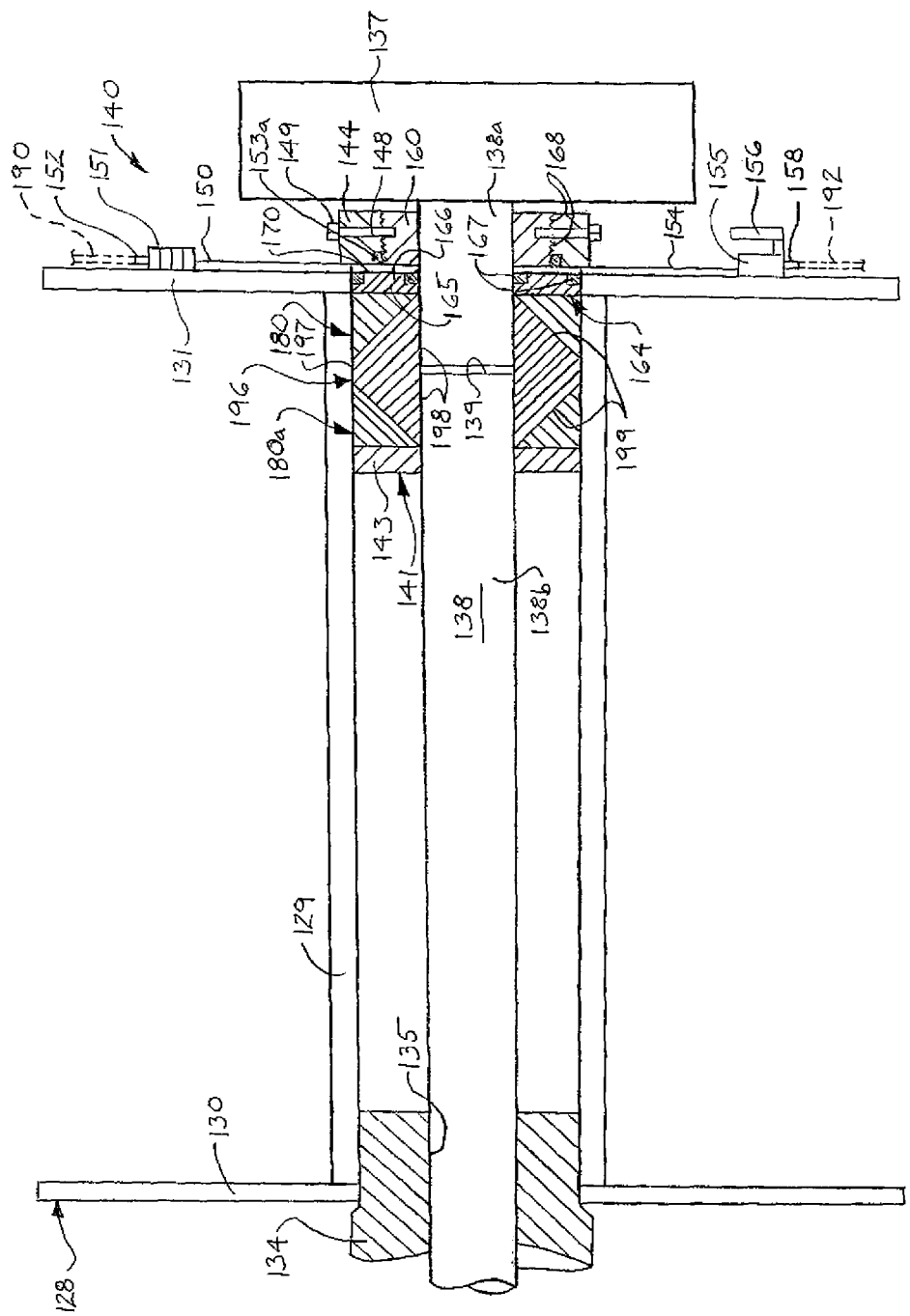
FIG. 17 is a longitudinal sectional view of the drum of the draw works with an alternative illustrative embodiment of the drum locking assembly for coupling the drum to the drum motor.
Figure 18:
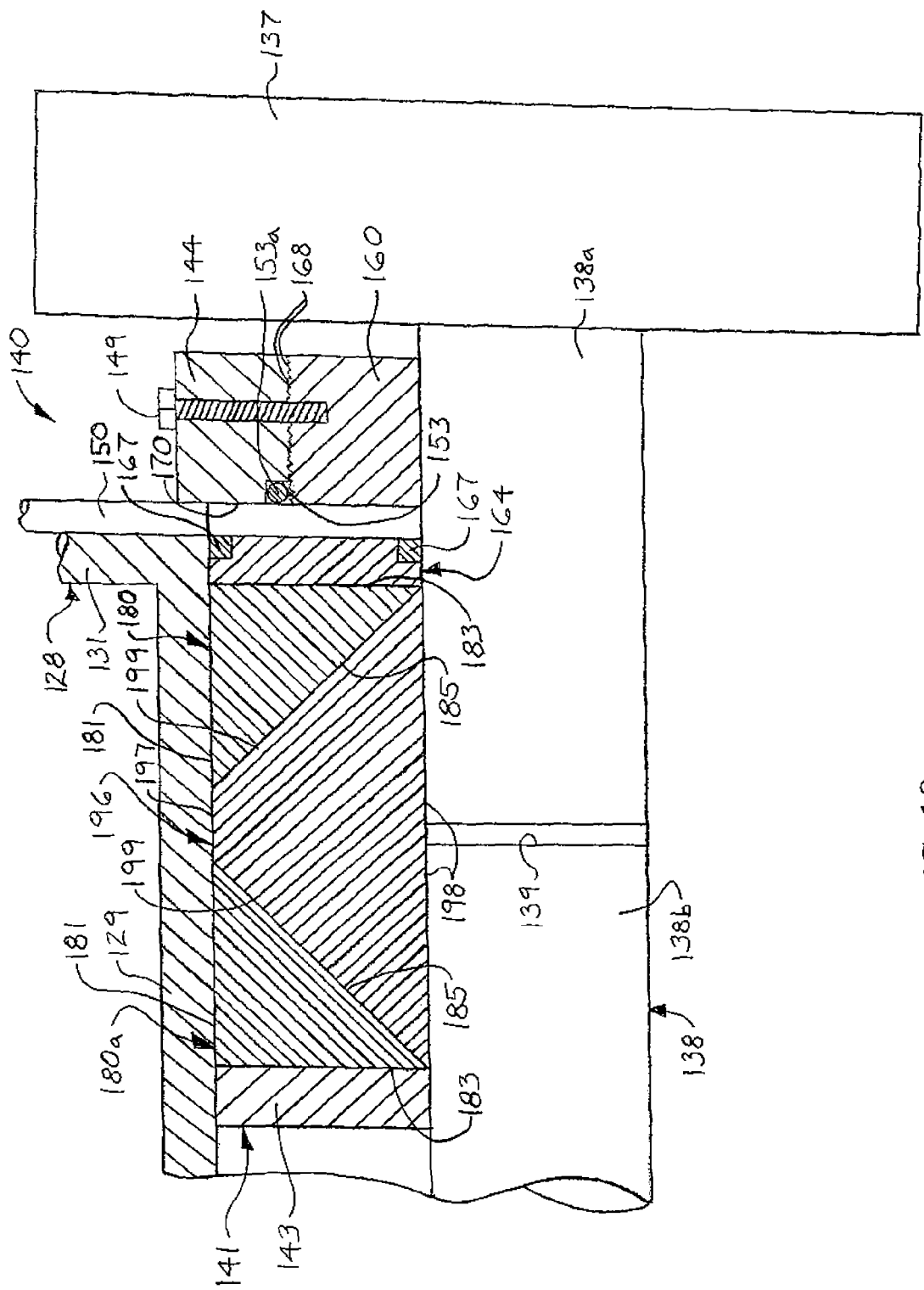
FIG. 18 is an enlarged longitudinal sectional view of the drum locking assembly of FIG. 17, disposed in a depressurized shaft-disengaging configuration.
Figure 19:
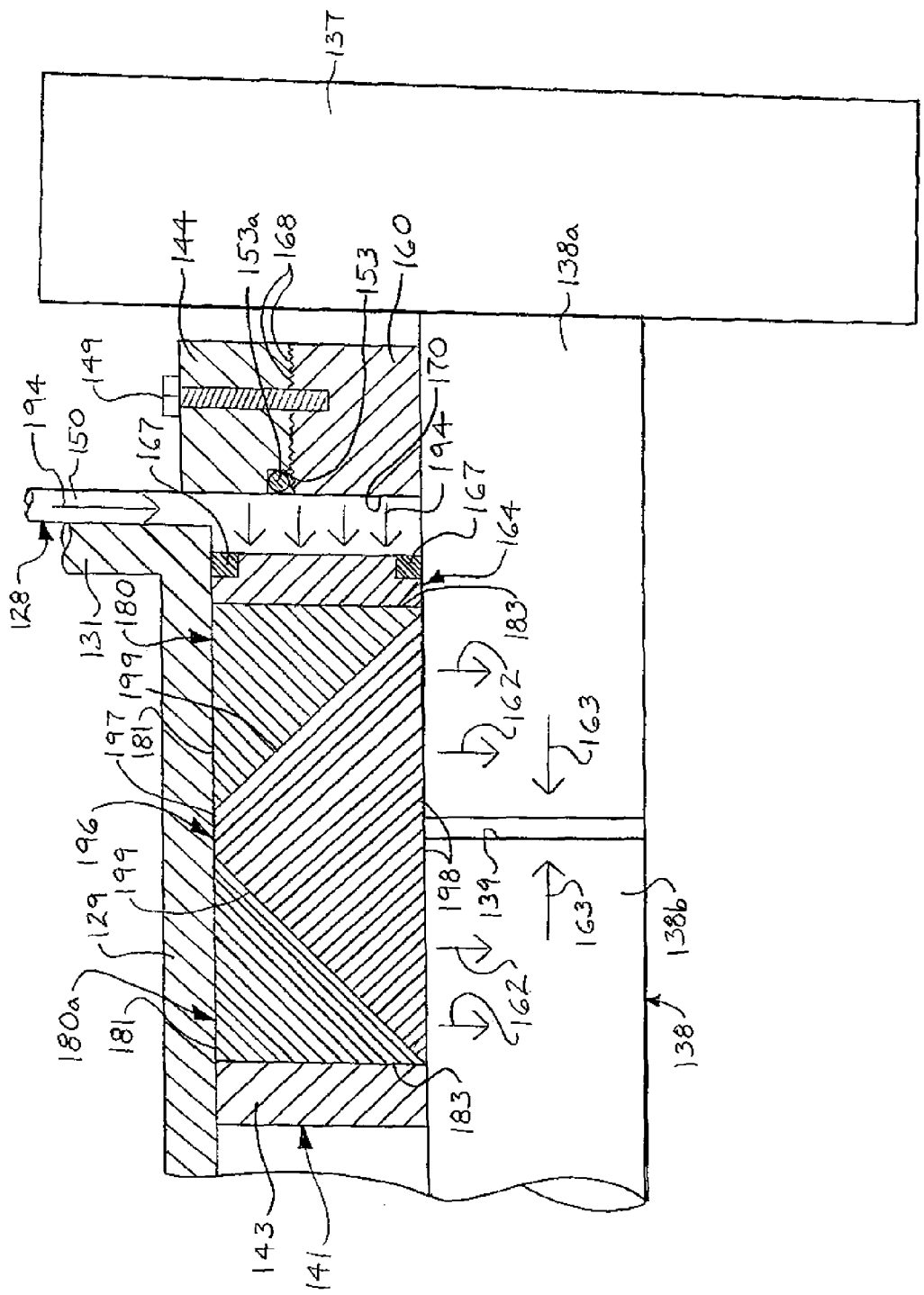
FIG. 19 is an enlarged longitudinal sectional view of the drum locking assembly of FIG. 17, disposed in a pressurized shaft-engaging configuration.

Referring next to FIGS. 17-19 of the drawings, an alternative illustrative embodiment of the shaft locking assembly is generally indicated by reference numeral 140. In the shaft locking assembly 140, elements which are analogous to the respective elements of the shaft locking assembly 40 that was heretofore described with respect to FIGS. 1-16 are designated by the same numeral in the 100-199 series in FIGS. 17-19. The shaft locking assembly 140 facilitates selective coupling of a driven segment 138b to a drive segment 138a of the drive shaft 138, with the drive motor 137 drivingly engaging the drive segment 138a. A shaft gap 139 may exist between the drive segment 138a and the driven segment 138b. Accordingly, the shaft locking assembly 140 may include at least one annular pusher sleeve 180, 180a and an annular shaft locking sleeve 196 which engages the assembly hub 141 and the drive segment 138a and the driven segment 138b of the drive shaft 138. In some embodiments, the shaft locking assembly 140 may include an annular proximal pusher sleeve 180 which is engaged by the push plate 164, an annular shaft locking sleeve 196 which is engaged by the proximal pusher sleeve 180 and a distal pusher sleeve 180a which is engaged by the shaft locking sleeve 196 and engages the stop plate 143 of the assembly hub 141.

As illustrated in FIGS. 18 and 19, the shaft locking sleeve 196 may include an outer sleeve surface 197 which engages the inner surface of the drum cylinder 129, an inner sleeve surface 198 which engages the drive segment 138a and the driven segment 138b and straddles the shaft gap 139 of the drive shaft 138, and a pair of pusher sleeve engaging surfaces 199 which diverge or taper outwardly from the outer sleeve surface 197 to the inner sleeve surface 198. The proximal pusher sleeve 180 may include a narrow bore end 183 which is engaged by the push plate 164 and a tapered interior sleeve surface 185 which engages one of the pusher sleeve engaging surfaces 199 of the shaft locking sleeve 196. The distal pusher sleeve 180a may include a narrow bore end 183 which engages the stop plate 143 of the assembly hub 141 and a tapered interior sleeve surface 185 which is engaged by the other pusher sleeve engaging surface 199 of the shaft locking sleeve 196. In some embodiments, a shaft locking sleeve slot 77 (FIGS. 8 and 10) may be provided in the shaft locking sleeve 196 and a pusher sleeve slot 86 (FIGS. 11-13) may be provided in each of the proximal pusher sleeve 180 and the distal pusher sleeve 180a.

Operation of the shaft locking assembly 140 may be as was heretofore described with respect to operation of the shaft locking assembly 40 in FIGS. 1-16. The pre-pressurized configurations of the proximal pusher sleeve 180, the shaft locking sleeve 196 and the distal pusher sleeve 180a are illustrated in FIG. 18. Upon flow of the pressurizing fluid 194 into the fluid pressure space 170, as illustrated in FIG. 19, typically by operation of the fluid pressurizing system 32 (FIG. 6), as was heretofore described, the pressurizing fluid 194 applies pressure against the push plate 164, which in turn applies pressure against the proximal pusher sleeve 180. The proximal pusher sleeve 180 pushes against the shaft locking sleeve 196, which pushes against the distal pusher sleeve 180a. The distal pusher sleeve 180a pushes against the stop plate 143. Accordingly, the shaft locking sleeve 196 is compressed between the proximal pusher sleeve 180 and the distal pusher sleeve 180a and contracts against the drive segment 138a and the driven segment 138b of the drive shaft 138 with a shaft compression force 162, exerting a shaft joining force 163 which couples the driven segment 138b to the drive segment 138a. Thus, upon operation of the drum motor 137, rotation is transmitted from the drive segment 138a to both the driven segment 138b of the drive shaft 138 and to the drum 128 through the shaft locking sleeve 196. Fluid pressure may be released from the fluid pressure space 170 by coupling of the fluid outlet hose 192 to the outlet hose connector 158 and opening the fluid outlet valve 155 using the valve handle 156, as was heretofore described with respect to FIGS. 5 and 6.

Figure 20:
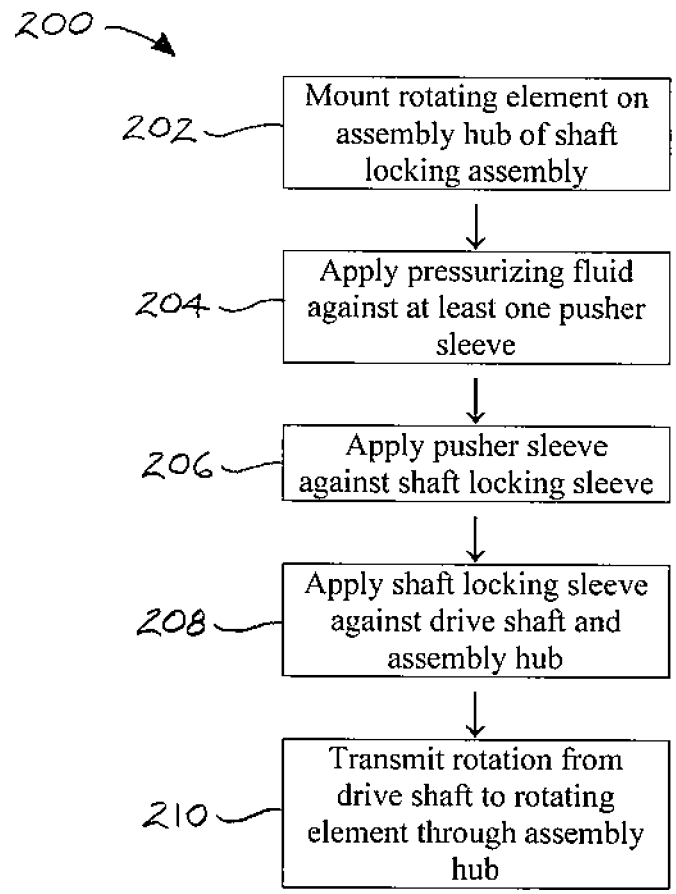
FIG. 20 is a flow diagram of an illustrative embodiment of a shaft locking method.

Referring next to FIG. 20 of the drawings, a flow diagram of an illustrative embodiment of a shaft locking method is generally indicated by reference numeral 200. The shaft locking method 200 may be used to drivingly couple a rotating element to a drive shaft. In some embodiments, the shaft locking method 200 may be used to selectively couple a drum to a drive shaft in a draw works which is operated to selectively raise and lower a traveling block on a derrick of a swab rig, for example and without limitation. At block 202, a rotating element may be mounted on an assembly hub of a shaft locking assembly. In some embodiments, the rotating element may include a drum on a draw works. At block 204, a pressurizing fluid may be applied against at least one pusher sleeve of the shaft locking assembly. At block 206, the pusher sleeve may be pushed against a shaft locking sleeve. At block 208, the shaft locking sleeve may be applied or contracted against the drive shaft and the assembly hub. In some embodiments, the force of a pressurizing fluid may be applied against a proximal pusher sleeve, the proximal pusher sleeve may be applied against the shaft locking sleeve and the shaft locking sleeve may be applied against a distal pusher sleeve. The shaft locking sleeve may be compressed between the proximal pusher sleeve and the distal pusher sleeve and against the drive shaft to couple a drive segment to a driven segment of the drive shaft. In some embodiments, the pressurizing fluid may be applied against a push plate and the push plate may be applied against the pusher sleeve. At block 210, rotation may be transmitted from the drive shaft to the rotating element through the assembly hub.

While illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A shaft locking assembly for a drive shaft, comprising:
   an assembly hub configured to accommodate the drive shaft, the assembly hub including a stop plate;
   an assembly hub interior in the assembly hub;
   a contractible shaft locking sleeve disposed in the assembly hub interior and configured to accommodate the drive shaft, the shaft locking sleeve engaging the stop plate;
   at least one pusher sleeve engaging the shaft locking sleeve;
   a fluid pressure space disposed in pressure transmitting relationship to the pusher sleeve;
   a fluid pressurizing mechanism disposed in fluid communication with the fluid pressure space;
   the pusher sleeve adapted to push against the shaft locking sleeve and the shaft locking sleeve adapted to contract and push against the stop plate and contract against the drive shaft responsive to introducing a pressurizing fluid into the fluid pressure space; and
   a push plate engaging the pusher sleeve, and wherein the fluid pressure space communicates with the push plate.

2. The shaft locking assembly of claim 1 wherein the pusher sleeve comprises a sleeve body including a narrow bore end engaged by the push plate, a wide bore end opposite the narrow bore end, a pusher sleeve bore extending from the narrow bore end to the wide bore end and an interior sleeve surface in the pusher sleeve bore, the interior sleeve surface engaging the shaft locking sleeve.

3. The shaft locking assembly of claim 2 further comprising a pusher sleeve slot extending through the sleeve body from the narrow bore end to the wide bore end.

4. The shaft locking assembly of claim 1 wherein the shaft locking sleeve comprises a locking sleeve base, a tapered locking sleeve wall extending from the locking sleeve base and engaging the interior sleeve surface of the pusher sleeve and a locking sleeve end terminating the locking sleeve wall at the push plate.

5. The shaft locking assembly of claim 4 further comprising a locking sleeve slot extending through the locking sleeve wall from the locking sleeve base to the locking sleeve end.

6. The shaft locking assembly of claim 1 further comprising a shaft hub carried by the assembly hub, and wherein the fluid pressure space is formed by and between the push plate and the shaft hub.

7. The shaft locking assembly of claim 6 further comprising a fluid inlet passage and a fluid outlet passage in the assembly hub, the fluid inlet passage and the fluid outlet passage disposed in fluid communication with the fluid pressure space; a fluid inlet conduit disposed in fluid communication with the fluid inlet passage; a fluid outlet conduit disposed in fluid communication with the fluid outlet passage; a fluid inlet valve disposed in fluid communication with the fluid inlet conduit; an inlet hose connector disposed in fluid communication with the fluid inlet valve; a fluid outlet valve disposed in fluid communication with the fluid outlet conduit; and an outlet hose connector disposed in fluid communication with the fluid outlet valve.

8. The shaft locking assembly of claim 1 further comprising a drum carried by the assembly hub.

9. The shaft locking assembly of claim 8 wherein the drum comprises a drum cylinder carried by the assembly hub and a pair of spaced-apart drum flanges carried by the drum cylinder.

10. The shaft locking assembly of claim 9 further comprising a fluid inlet passage and a fluid outlet passage in the assembly hub and disposed in fluid communication with the fluid pressure space and a fluid inlet conduit and a fluid outlet conduit carried by one of the drum flanges and disposed in fluid communication with the fluid inlet passage and the fluid outlet passage, respectively.

11. The shaft locking assembly of claim 10 further comprising a fluid inlet valve disposed in fluid communication with the fluid inlet conduit, an inlet hose connector disposed in fluid communication with the fluid inlet valve, a fluid outlet valve disposed in fluid communication with the fluid outlet conduit and an outlet hose connector disposed in fluid communication with the fluid outlet valve.

12. A shaft locking assembly for a drive shaft having a drive segment, a driven segment and a shaft gap between the drive segment and the driven segment, the shaft locking assembly comprising:
   an assembly hub including a stop plate;
   a distal pusher sleeve engaging the stop plate;
   a contractible shaft locking sleeve engaging the distal pusher sleeve, the shaft locking sleeve adapted to straddle the shaft gap between the drive segment and the driven segment of the drive shaft;
   a proximal pusher sleeve engaging the shaft locking sleeve;
   a push plate engaging the proximal pusher sleeve;
   a fluid pressure space disposed in pressure transmitting relationship to the proximal pusher sleeve;
   a fluid pressurizing mechanism disposed in fluid communication with the fluid pressure space;
   the proximal pusher sleeve adapted to push against the shaft locking sleeve, the shaft locking sleeve adapted to push against the distal pusher sleeve and the shaft locking sleeve adapted to contact and push against the drive shaft segment and the driven shaft segment of the drive shaft responsive to introducing a pressurizing fluid into the fluid pressure space; and
   a push plate engaging the proximal pusher sleeve, and wherein the fluid pressure space communicates with the push plate.

13. The shaft locking assembly of claim 12 wherein the shaft locking sleeve comprises an outer sleeve surface, an inner sleeve surface and a pair of beveled pusher sleeve engaging surfaces diverging from the outer sleeve surface to the inner sleeve surface, and the distal pusher sleeve and the proximal pusher sleeve each comprises a beveled interior sleeve surface engaging a corresponding one of the pusher sleeve engaging surfaces of the shaft locking sleeve.

14. The shaft locking assembly of claim 12 further comprising a fluid inlet conduit and a fluid outlet conduit disposed in fluid communication with the fluid pressure space, a fluid inlet valve disposed in fluid communication with the fluid inlet conduit, an inlet hose connector disposed in fluid communication with the fluid inlet valve, a fluid outlet valve disposed in fluid communication with the fluid outlet conduit and an outlet hose connector disposed in fluid communication with the fluid outlet valve.

15. A method of locking a rotating element on a drive shaft, comprising:
   mounting the rotating element on an assembly hub of a shaft locking assembly;
   placing a push plate against at least one pusher sleeve:
   placing a fluid pressure space in communication with the push plate;
   applying the push plate against the pusher sleeve by introducing a pressurizing fluid into the fluid pressure space against the push plate;

applying the pusher sleeve against a shaft locking sleeve; and applying the shaft locking sleeve against the drive shaft and the assembly hub.

16. The method of claim 15 wherein mounting the rotating element on an assembly hub comprises mounting a drum on the assembly hub.

17. The method of claim 15 wherein placing the push plate against the at least one pusher sleeve comprises placing the push plate against a proximal pusher sleeve, and applying the push plate against the pusher sleeve comprises applying the push plate against the proximal pusher sleeve by introducing the pressurizing fluid into the fluid pressure space against the push plate, and further comprising applying the shaft locking sleeve against a distal pusher sleeve.

* * * * *